United States Patent [19]
Rhoden et al.

[11] Patent Number: 5,251,296
[45] Date of Patent: Oct. 5, 1993

[54] METHODS AND APPARATUS FOR GENERATING ARBITRARILY ADDRESSED, ARBITRARILY SHAPED TILES IN COMPUTER GRAPHICS SYSTEMS

[75] Inventors: Desi Rhoden, Boulder; Byron A. Alcorn, Fort Collins; Darel N. Emmot, Ft. Collins; Ronald D. Larson, Fort Collins, all of Colo.

[73] Assignee: Hewlett-Packard Company, Palo Alto, Calif.

[21] Appl. No.: 494,997

[22] Filed: Mar. 16, 1990

[51] Int. Cl.$^5$ ............... G06F 15/20; G06F 15/00
[52] U.S. Cl. ...................... 395/164; 395/166; 395/162; 345/196
[58] Field of Search ............ 395/162, 164, 166, 165; 340/721, 799

[56] References Cited

U.S. PATENT DOCUMENTS

| | | | |
|---|---|---|---|
| 4,695,772 | 9/1987 | Lau et al. | 315/370 |
| 4,742,474 | 5/1988 | Knierim | 395/165 |
| 4,780,709 | 10/1988 | Randall | 340/721 |
| 4,933,879 | 6/1990 | Ando et al. | 395/164 |
| 4,985,848 | 1/1991 | Pfeiffer et al. | 395/164 |
| 5,038,297 | 8/1991 | Hannah | 395/164 |
| 5,062,057 | 10/1991 | Blacken et al. | 395/166 |
| 5,131,080 | 7/1992 | Fredrickson et al. | 395/164 |

FOREIGN PATENT DOCUMENTS

WO89/06031  6/1989  PCT Int'l Appl.

OTHER PUBLICATIONS

European Search Report, Nov. 9, 1992, EP 91 30 2147.
IEEE Computer Graphics and Applications, vol. 7, No. 3, Mar. 1987, New York, "A Configurable Pixel Cache for Fast Image Generation," A. Goris et al., pp. 24–32.
IBM Journal of Research and Development, vol. 28, No. 4, Jul. 1984, Armonk, USA, "All Points Addressable Raster Display Memory," R. Matick et al., pp. 379–392.
D. Rhoden & C. Wilcox, "Hardware Acceleration for Window Systems", Computer Graphics, vol. 23, No. 3, Jul. 1989.

Primary Examiner—Dale M. Shaw
Assistant Examiner—Kee M. Tung
Attorney, Agent, or Firm—Guy J. Kelley

[57] ABSTRACT

Methods and apparatus for rendering graphics primitives to display devices in a computer graphics frame buffer system are disclosed. The methods provide an array of addressable video random access memory (VRAM) chips associated to form the graphics frame buffer. The VRAMs in the frame buffer are addressed with coordinate pixel locations on the display device corresponding to locations of the graphics primitives on the display device. The frame buffer is accessed with a graphics rendered according to arbitrarily shaped tiles containing pixels such that the pixels within the tiles have potentially different VRAM addresses.

18 Claims, 4 Drawing Sheets

METHODS AND APPARATUS FOR GENERATING ARBITRARILY ADDRESSED, ARBITRARILY SHAPED TILES IN COMPUTER GRAPHICS SYSTEMS

FIELD OF THE INVENTION

This invention relates to methods and apparatus for rendering graphics primitives to frame buffers in computer graphics systems. More specifically, this invention relates to methods and apparatus for generating arbitrarily shaped tiles in computer graphics systems that render graphics primitives to frame buffers and display devices in the computer graphics systems.

BACKGROUND OF THE INVENTION

Computer graphics workstations can provide highly detailed graphics simulations for a variety of applications. Engineers and designers working in the computer aided design (CAD) and computer aided manufacturing (CAM) areas typically utilize graphics simulations for a variety of computational tasks. The computer graphics workstation industry has thus been driven to provide more powerful computer graphics workstations which can perform graphics simulations quickly and with increased detail.

Modern workstations having graphics capabilities generally utilize "window" systems to organize graphics manipulations. As the industry has been driven to provide faster and more detailed graphics capabilities, computer workstation engineers have tried to design high performance, multiple window systems which maintain a high degree of user interactivity with the graphics workstation.

A primary function of window systems in such graphics systems is to provide the user with simultaneous access to multiple processes on the workstation. Each of these processes provides an interface to the user through its own area onto the workstation display. The overall result for the user is an increase in productivity since the user can then manage more than one task at a time with multiple windows displaying multiple processes on the workstation.

In graphics systems, some scheme must be implemented to "render" or draw graphics primitives to the system's screen. "Graphics primitives" are a basic component of a graphics picture, such as a polygon or vector. All graphics pictures are formed with combinations of these graphics primitives. Many schemes may be utilized to perform graphics primitives rendering. One such scheme is the "spline tessellation" scheme utilized in the TURBO SRX graphics system provided by the Hewlett Packard Graphics Technology division, Fort Collins, Colo.

The graphics rendering procedure generally takes place within a piece of graphics rendering hardware called a "frame buffer." A frame buffer generally comprises a plurality of video random access memory (VRAM) computer chips which store information concerning pixel activation on the system's display screen corresponding to the particular graphics primitives which will be traced out on the screen. Generally, the frame buffer contains all of the pixel activation data, and stores this information until the graphics system is prepared to trace this information on the workstation's screen. The frame buffer is generally dynamic and is periodically refreshed until the information stored on it is written to the screen.

Thus, computer graphics systems convert image representations stored in the computer's memory to image representations which are easily understood by humans. The image representations are typically displayed on a cathode ray tube (CRT) device that is divided into arrays of pixel elements which can be stimulated to emit a range of colored light. The particular color of light that a pixel emits is called its "value." Display devices such as CRTs typically stimulate pixels sequentially in some regular order, such as left to right and top to bottom, and repeat the sequence 50 to 70 times a second to keep the screen refreshed. Thus, some mechanism is required to retain a pixel's value between the times that this value is used to stimulate the display. The frame buffer is typically used to provide this "refresh" function.

Frame buffers, or "display processors," for displaying data in windows on display screens in graphics rendering systems are known in the art. See U.S. Pat. No. 4,780,709, Randall. As taught in the Randall patent, a display processor divides a display screen such as a CRT into a plurality of horizontal strips, with each strip being further subdivided into a plurality of "tiles." Each tile represents a portion of a window to be displayed on the screen, and each tile is further defined by tile descriptors which include memory address locations of data to be displayed in that particular tile. See Randall, col. 2, lines 23-35. The tiles generally contain a plurality of pixels, although a tile can be as small as one pixel in width. Each viewing window may be arbitrarily shaped by combinations of different tiles which are rectangularly shaped See Randall, col. 1, lines 55-67.

Since frame buffers are usually implemented as arrays of VRAMs, they are "bit mapped" such that pixel locations on a display device are assigned x,y coordinates on the frame buffer. A single VRAM device rarely has enough storage location to completely store all the x,y coordinates corresponding to pixel locations for the entire image on a display device, and therefore multiple VRAMs are generally used. The particular mapping algorithm used is a function of various factors, such as what particular VRAMs are available, how quickly the VRAM can be accessed compared to how quickly pixels can be rendered, how much hardware it takes to support a particular mapping, and other factors.

In high performance computer workstation systems, it is generally desirable to access as many pixels simultaneously as is practical. However, to access as many pixels simultaneously as possible implies that each VRAM cycle accesses all VRAMs. Furthermore, high-density VRAMs are generally much slower than the hardware that renders pixels. There is therefore a long-felt need in the art for computer graphics renderers and frame buffers which allow simultaneous access to as many pixels as are needed to render an image, thereby reducing the number of accesses required to the frame buffer to completely render the image and decreasing the time it takes to ultimately write a graphics primitive to the system's screen.

Typical CRT devices for use with graphics workstations are "raster scan" display devices. Typical raster scan display devices generate images comprising a multiplicity of parallel, non-overlapping bands of pixels comprising sets of parallel lines. An example of such a system is disclosed in U.S. Pat. No. 4,695,772, Lau et al. The raster scan device disclosed in the Lau et al. patent is organized as an array of tiles. See Lau et al, col. 2, line 36.

Raster scan devices generally utilize a multiplicity of beams for the red, green and blue (RGB) channels in the CRT. The multiplicity of beams generally write from the left side of the display CRT to the right side of the display CRT. For the purposes of dividing the CRT into tiles (a process called "tiling"), each tile is considered to comprise a height or resolution equal to the multiplicity of scan lines, with each tile being a particular number of pixels wide. The resulting graphics primitive image thus comprises a multiplicity of parallel, non-overlapping sets of parallel lines of pixels generated by a separate sweep of electron beams across the CRT screen. The tiles are generally rectangular, and thus organize the image into arrays having a plurality of rows by a set number of columnar tiles. See Lau et al., col. 4, lines 12-27.

Typically, rendering algorithms calculate consecutive pixel values for consecutive pixels with small changes in their x,y addresses from pixel to pixel. This means that there is a large degree of "coherency" in the pixel addresses. When arranging VRAMs for simultaneous pixel access, it is desirable that the pixels that are accessed are allowed to be highly coherent.

The VRAMs are arranged so that a rectangular region of the display that contains "tile-sized" pixels has one pixel accessed from each VRAM that comprises a bank. A "bank" is a slice of the depth required for each pixel, where the "depth" may be conveniently thought of as a VRAM width. The number of banks available to a pixel is thus equal to the depth of the tile divided by the VRAM width, and the "tile size" is defined as the number of VRAMs divided by the number of banks.

To illustrate this organization, consider a tile size of 16 with the VRAMs organized as a 4×4 array. Each VRAM may be denoted by a letter and thus, the letters A through P denote 16 particular VRAMs. In general, frame buffers are replicated in the horizontal and vertical directions and each VRAM contains multiple pixels with each instance of a VRAM denoting a unique pixel location. For a tile size of 16, 16 coherent pixels share a common VRAM address. Thus, a traditional method for physically addressing the VRAMs has evolved since, if all the VRAMs in the frame buffer are always given the same VRAM address, a rectangular group of pixels will be accessed with each VRAM cycle. This rectangular group of pixels is denoted a "tile" as previously discussed.

Prior rendering algorithms to generate pixel values sequentially generate all the pixels that make up a primitive, such as a polygon. Each primitive that comprises an image representation is used sequentially to generate pixel values. Therefore, a group of pixel values is generated which is stored in the frame buffer VRAMs. The x,y addresses of at least one of the pixels of a primitive is used to determine what row and column address should be applied to the VRAMs. Then, all the pixels in the appropriate VRAMs. However, not all pixels in the group are accessible with a first tile access, and therefore additional tiles must be accessed from the frame buffer in order for the system to write a primitive to a CRT.

The average number of pixels actually stored with each tile access is called the "tile hit rate." Since primitives are usually not rectangular, the tile hit rate can be rather low because each access to the frame buffer cannot hit every row and column address for each pixel outside of a rectangular region. There is therefore a long-felt need in the art to improve tile hit rates on frame buffer computer graphics systems. This long-felt need in the art has not heretofore been adequately met by any prior rendering algorithms or computer workstation frame buffers and renderers.

SUMMARY OF THE INVENTION

Methods of rendering graphics primitives to display devices in a computer graphics frame buffer system are provided in accordance with the present invention. The methods comprise the steps of providing an array of addressable video random access memory (VRAM) chips associated to perform the graphics frame buffer, addressing the VRAMs in the frame buffer with coordinate pixel locations on the display device corresponding to locations of the graphics primitives on the display device, and accessing the frame buffer with a graphics renderer according to arbitrarily-shaped tiles containing pixels such that the pixels within the tiles have potentially different VRAM addresses.

Additionally, systems for rendering graphics primitives are provided in accordance with this invention. The systems comprise means for displaying the graphics primitives, frame buffer means interfaced with the display means for addressing the primitive's locations on the display means according to a plurality of rows and columns, rendering means interfaced with the frame buffer means for generating groups of pixel values on a display means corresponding to the graphics primitives, and access means interfaced with the frame buffer means for accessing tiles on the frame buffer means wherein the tiles are dynamically modified by the access means to obtain a best fit of the groups of pixels to the graphics primitives.

DETAILED DESCRIPTION OF PREFERRED EMBODIMENTS

The above-mentioned long-felt needs are solved by methods and apparatus provided in accordance with the present invention which provides arbitrarily addressed and arbitrarily shaped tiles in computer graphics frame buffer oriented systems. All graphics subsystems can be considered to be tile organized. The main difference between the various different kinds of tile-organized graphics subsystems on the market today is the size of the tiles. For example, some graphics subsystems access single pixels which can be considered as 1×1×1 tiles. Others access tile sizes that are multiple pixels in the x,y (row and column) directions.

Typical raster scan displays are organized along scan lines wherein pixels in the display are activated according to bit-mapped or frame buffer coordinate pixel values. In this way, graphics primitives which potentially have random orientations and sizes are plotted on the raster display. A frame buffer is accessed by a scanning raster CRT according to a row address strobe (RAS) and a column address strobe (CAS).

Figure 1:
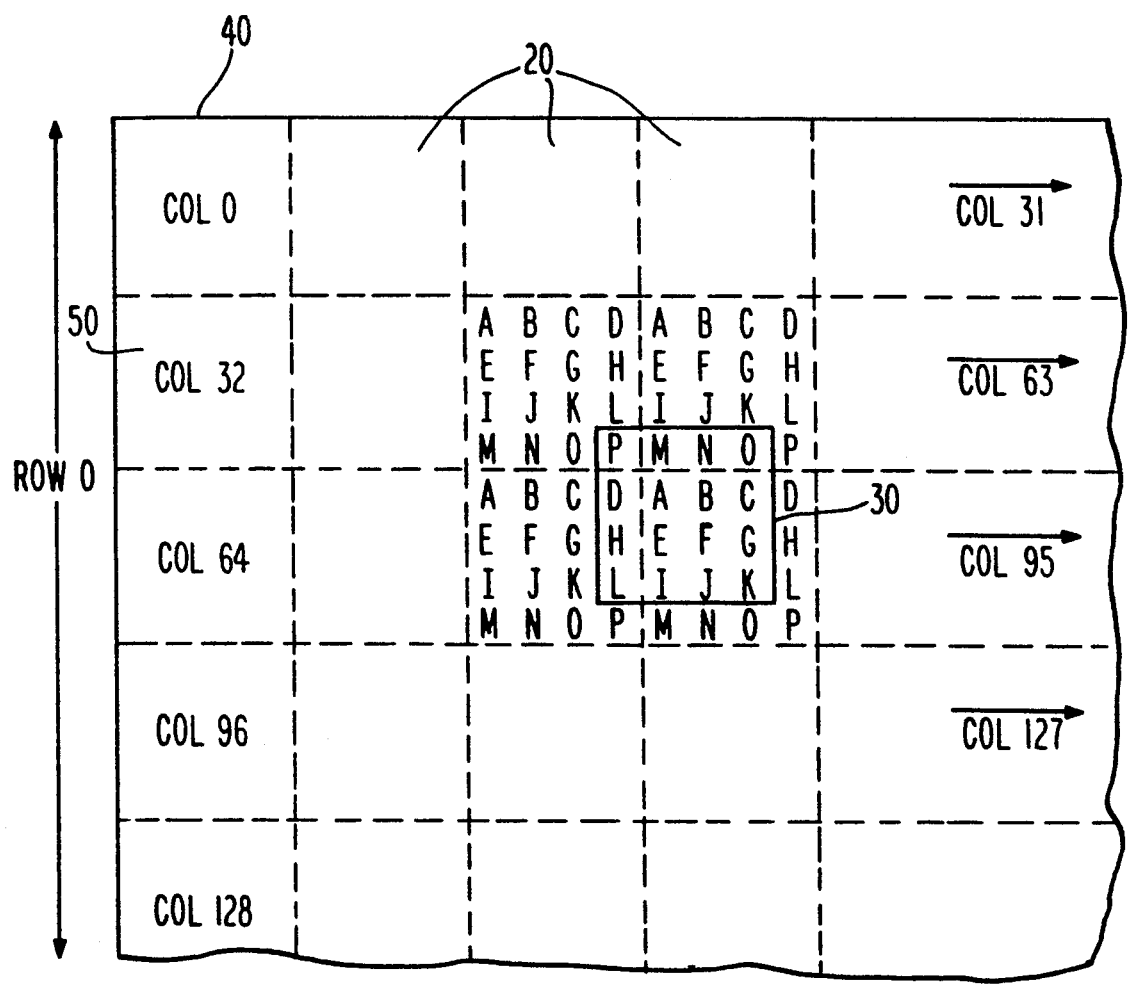
FIG. 1 depicts a frame buffer comprised of a plurality of VRAMs wherein rectangularly shaped tiles are generated.

To illustrate tile organization in a raster scan CRT and graphics frame buffer system, consider a standard 4 ×4 tile organization with a RAS size of 128 w×32 h and 32 w ×8 h columns shown in FIG. 1. Since each tile size is 4 ×4, there are a total of 16 VRAMs in each of the blocks shown generally at 20. Each VRAM is assigned a letter, A through P, as shown in the center blocks which have been replicated four times. By individually addressing each of the VRAMs, there is no limitation on the orientation of the tile. Thus, any 4×4 area in the VRAM array is made up of all 16 RAMs such as the 4×4 tile shown at 30. Since in this array is made up of 128 K×8 parts each "pixel" is eight bits deep, and thus there is effectively byte addressability for the tile shown at 30.

The starting address of each scan line on the raster CRT is at the left side in FIG. 1. The upper left block corresponds to the upper left portion of the CRT device. Thus the first four scan lines start in column 0, row 0 shown generally at 40. Similarly, the second four scan lines start in column 32, row 0 shown at 50. The other sets of scan lines progress in a similar fashion and the cross between the row 0 and the row 1 in the horizontal direction (x) is just after column 31. The replication in the horizontal and vertical directions, x and y respectively, denote that each VRAM contains multiple pixels with each instance of a VRAM denoting a unique pixel location.

The dashed outlined regions of the frame buffer shown in FIG. 1 represent regions on the frame buffer where each pixel has the same VRAM address which is defined by a particular row and column number. Sixteen coherent pixels share a common VRAM address. The traditional method for physically addressing VRAMs in a frame buffer can then be illustrated with the frame buffer shown in FIG. 1 since all the VRAMs in the frame buffer are always given the same VRAM address. Therefore, a rectangular group of pixels will be accessed with each VRAM cycle.

Common rendering algorithms which generate pixel values and rectangular tiles usually sequentially generate all pixels that make up a primitive such as a polygon. Each primitive that composes the image representation is then used to sequentially generate pixel values. The pixel values are stored in the frame buffer VRAMs and the x,y address of at least one of the pixels is used to determine what row and column address should be applied to the VRAM. Then, all the pixels in the group so generated are stored in a rectangular tile of pixels. However, not all pixels in the tile will be accessible by the first rectangular tile access, so additional tiles must be accessed to complete the process of writing the graphics primitive to the CRT.

The average number of pixels actually stored in the tile is defined as the "tile hit rate." However, since primitives on the average are generally not rectangles and previous tiles in prior graphics frame buffer systems are rectangular, the tile hit rate can be rather low.

A low tile hit rate evinces an inefficient graphics frame buffer system which requires an increased number of frame buffer accesses to write the primitives to the screen. An increased number of frame buffer accesses further requires the computer graphics system to incur unacceptable computer overhead times.

In accordance with the present invention, the frame buffer is accessed in preferred embodiments according to non-rectangular tiles containing pixel values. The tile shapes are then dynamically modified to provide a "best fit" group of pixels generated by a graphics renderer to the graphics primitive. Although tiles provided in accordance with the present invention still represent some constant number of pixels that are accessed in parallel, in preferred embodiments the pixels within a tile are not restricted to having the same VRAM address. In still further preferred embodiments, a tile can be any group of pixels wherein each pixel comes from a unique VRAM. While the pixels are allowed to be coherent, they are not required to be coherent in accordance with the present invention.

Figure 2:
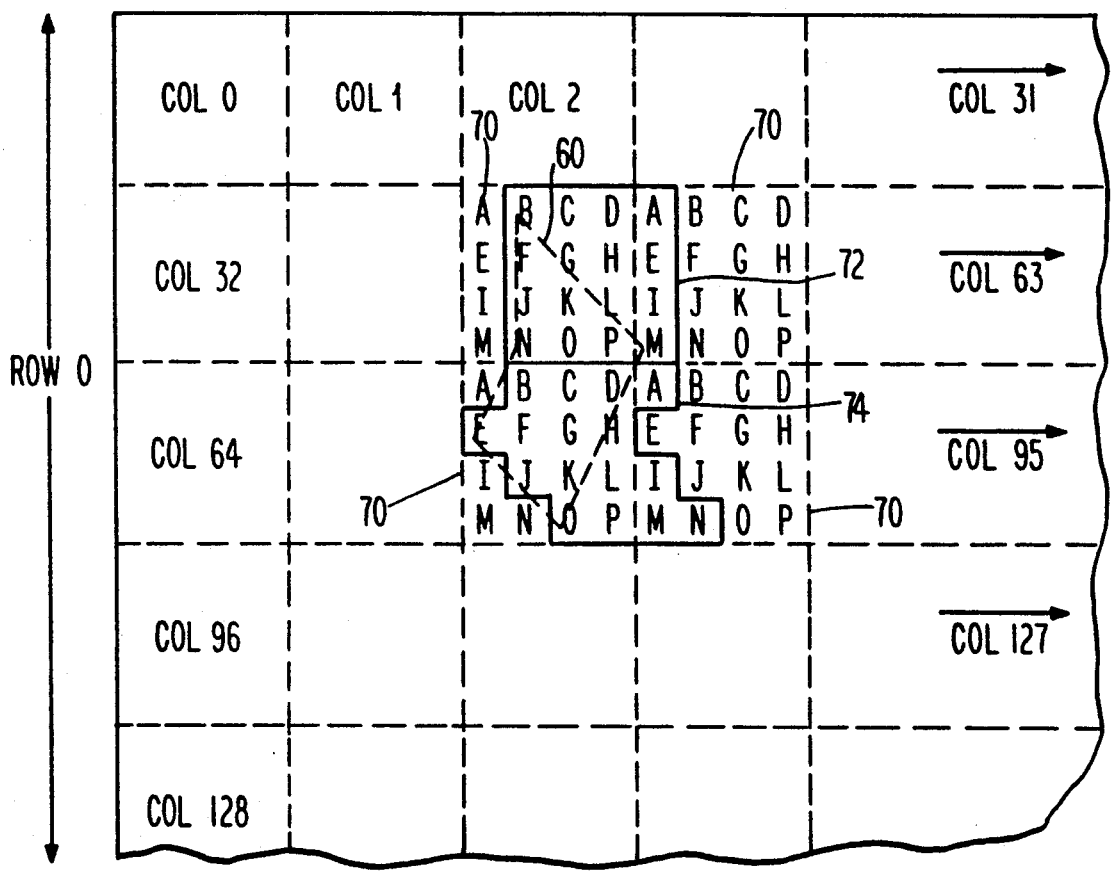
FIG. 2 depicts a frame buffer provided in accordance with the present invention wherein arbitrarily shaped, arbitrarily addressed tiles are generated.

Referring to FIG. 2, a comparison of tile hit rate for arbitrarily shaped, arbitrarily addressed tiles provided in accordance with the present invention for a graphics primitive on a frame buffer graphics system is compared to the hit rate for rectangular tiles. The desired primitive to be rendered is shown in dashed lines at 60. Accesses with rectangular tiles shown in dashed lines generally at 70 require four frame buffer accesses with an average of 4.75 pixels per tile when the tiles are rectangularly shaped. With tiles provided in accordance with the present invention, shown in a bold line at 72 and 74, only two frame buffer accesses are required to form the same primitive with an average of 9.5 pixels per accessed tile.

Tile 72, while being rectangular, is arbitrarily aligned containing all of the VRAMs A–P. Tile 74 is both arbitrarily shaped and arbitrarily aligned containing all of the VRAMs A–P. Thus, arbitrarily shaped tiles increase the hit rate an average of 100% over fixed rectangularly shaped and rectangularly aligned tiles. This provides a significant decrease in the number of accesses required to the frame buffer in order to render the graphics primitive. Therefore arbitrarily shaped tiles provide the highly desired result of reducing frame buffer accesses, thereby reducing microprocessor overhead time and increasing the speed in which graphics primitives can be written to a CRT. Arbitrarily shaped and arbitrarily aligned tiles provided in accordance with the present invention solve a long-felt need in the art for graphics rendering systems which fully and efficiently utilize VRAM architecture in a frame buffer and greatly reduce the time necessary to write graphics primitives to a display device.

Figure 3:
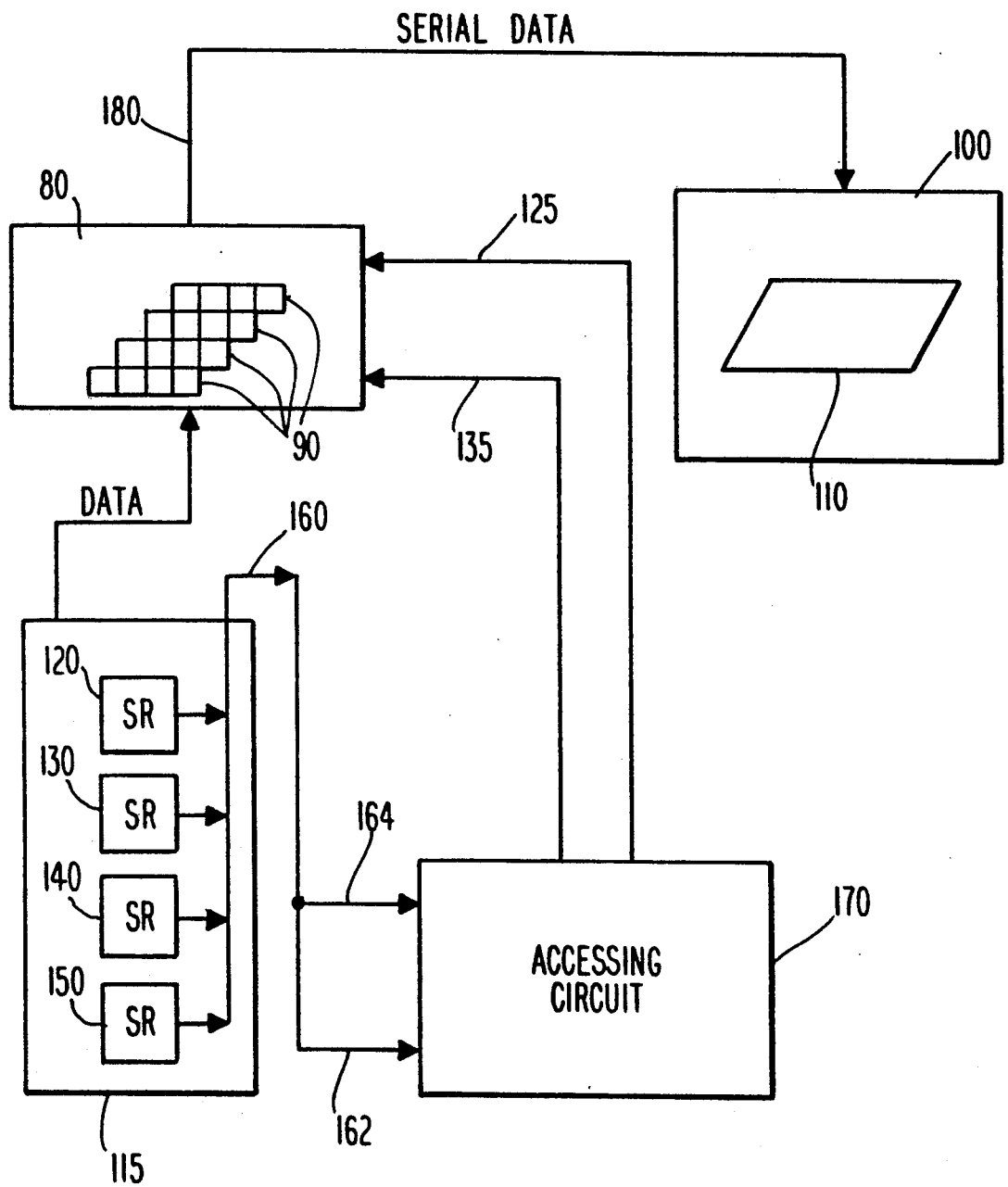
FIG. 3 depicts a system for generating arbitrarily shaped, arbitrarily addressed tiles that are rendered to a graphics frame buffer and for imaging graphics primitives on a display device such as a CRT.

Systems provided in accordance with the present invention generate arbitrarily shaped and arbitrarily aligned tiles on graphics frame buffers and write these graphics primitives to display devices such as CRTs. Referring to FIG. 3, a frame buffer is shown generally at 80. The frame buffer is divided into groups of arbitrarily shaped subtiles shown generally at 90. In preferred embodiments, the subtiles are comprised of 1×4 pixel tiles 90 which are arbitrarily aligned. CRT device 100 is shown with a graphics primitive 110 written thereto. As an example of a typical graphics primitive, a four-sided trapezoidal figure comprises graphics primitive 110. Display devices such as CRT 100 typically stimulate pixels sequentially 50–70 times a second so that primitive 110 remains imaged on CRT 100.

The CRT generally comprises pixels having x and y coordinate values. The x and y coordinate values correspond to row and column values respectively on frame buffer 80. Rendering means 115 is interfaced with the frame buffer 80 through a data line which busses pixel value data from the rendering means to the frame buffer through column address line 125 and row address line 135.

In still further preferred embodiments, rendering means 115 is divided into a set of four separate subrendering machines, shown at 120, 130, 140 and 150 respectively. Column address line 125 containing a CAS signal and row address line 135 containing a RAS signal is interfaced with each of the subrenderers 120, 130, 140 and 150. In accordance with the present invention, four independent subrenderers each generate all the pixel values for primitive 110 having the same y address, modulo 4. This allows a tile to have more vertical height to better match the shape of primitive 110.

Each of the four independent subrendering machines 120 through 150 are assigned a different modulo 4 number and each machine generates all pixels for primitive 110 with a given y address before generating any pixels with other y addresses. In this fashion, a group of pixels with the same y address is defined as a "span" and the pixels in a span are generated sequentially with consecutive x addresses. Each of the four subrenderers creates a separate span and since the four separate subrenderers are only loosely coupled, a given machine may completely render all pixels for a primitive and then move on to the next primitive independent of the other machines.

Each of the subrenderers 120 through 150 provides the x and y address of the first pixel it generates in each span and the direction in x which it intends to generate subsequent span pixels. Therefore, four such span addresses, one from each of the subrenderers, are used to generate addresses for the frame buffer VRAMs. In still further preferred embodiments, the arbitrarily shaped tiles provided in accordance with the present invention comprises of four groups of pixels with each group being coherent, but the four groups being uncorrelated. The four groups of pixels are shown at 90 and generate the tile corresponding to primitive 110 on the CRT. Furthermore, the pixels within a group represent at most two VRAM column addresses.

Rendering means 115 is interfaced to access means 170 through a data line 160. Date line 160 busses data comprising multiplexed and refresh addresses shown generally at 162, as well as span addresses, shown generally at 164, to access means 170. The frame buffer 80 is interfaced to the access means 170 through CAS line 125 and RAS line 135. Column address line 125 outputs a CAS signal from access means 170 to frame buffer 80 signifying the column scan for the raster display, while row address line 135 outputs a RAS signal to the frame buffer 80 for row scanning.

Port 180 of frame buffer 80 accesses CRT 100 when a new primitive must be imaged on CRT 100. When a new primitive which has been rendered to the frame buffer is to be imaged on CRT 100, port 180 is enabled by the access means so that the tiles on frame buffer 80 representing pixels in the new primitive can be traced on the CRT 100.

Figure 4:
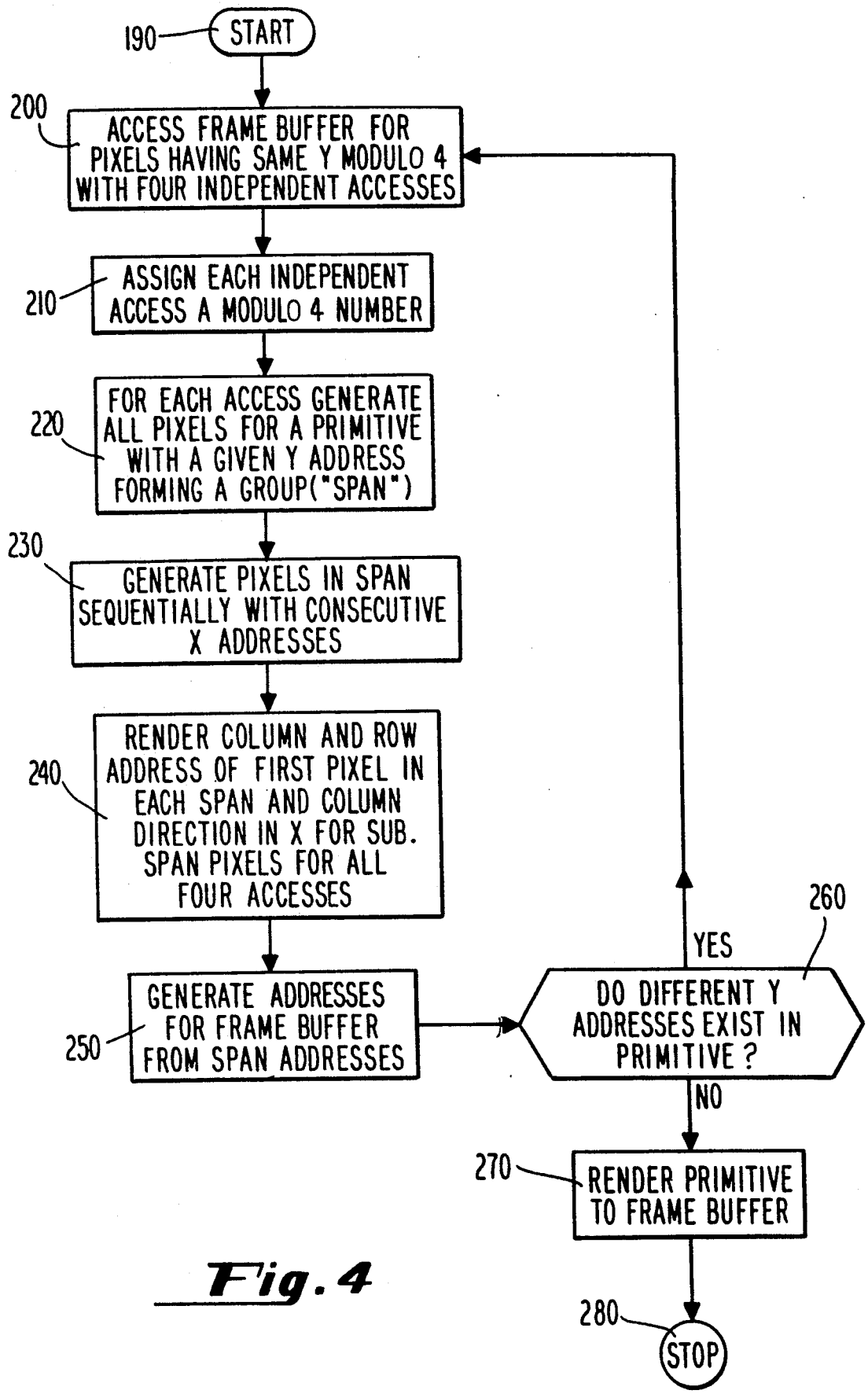
FIG. 4 is a flow chart illustrating a method for generating arbitrarily shaped, arbitrarily addressed tiles to a graphics frame buffer and displaying the arbitrarily shaped, arbitrarily addressed tiles corresponding to graphics primitives on a display device.

Referring to FIG. 4, a flow chart of preferred embodiments of methods for imaging primitives on graphics display devices is illustrated. The process begins at step 190. It is desired at step 200 to access the frame buffer for pixels having the same y address, modulo 4, with four independent accesses. At step 210, each of the independent accesses is assigned a modulo 4 number. Preferably for each access, all pixels with a given y address for a particular primitive are generated, thereby forming a group of pixels which is defined as a span at step 220. There are thus four independent spans generated.

At step 230, four such spans are generated sequentially with consecutive x addresses. At step 240 it is generally desired to render the column and row addresses of a first pixel in each span, and the column direction in x for subsequent span pixels for all four accesses of the frame buffer VRAMs. At step 250, addresses are generated for the frame buffer from each of the span addresses so determined at step 220 through 240.

At step 260, it is desired to determine whether different y addresses for the primitive are needed. If different y addresses corresponding to columns do indeed exist for the primitive, the process begins again at step 200 and new span addresses and thus a tile for a new set of spans corresponding to different column addresses are calculated. If there are no more column or y addresses, then the primitive has been rendered to the frame buffer at step 270 and the CRT can subsequently either be refreshed with the primitive or initially plotted with the primitive. The process is then stopped at 280.

The four spans so generated for each column address modulo 4 create an arbitrarily shaped and arbitrarily addressed tile which increases the tile hit rate for frame buffer access at least 100% over a fixed rectangular shape and rectangularly aligned tile. This is accomplished by heating arbitrarily shaped arbitrarily aligned tiles which provide a "best fit" tile to graphics primitves on the system. This is a highly desirable result since the microprocessor time to image the primitives from tiles rendered to the frame buffer is greatly reduced and the speed in which primitives are written to the graphics system display device is substantially increased.

Thus, arbitrarily shaped, arbitrarily addressed tiles provided in accordance with the present invention which are dynamically modified to provide a best fit from the group of pixels generated by the renderer solve a long-felt need in the art for devices which rapidly and efficiently plot graphics images rendered on frame buffers to graphics display devices, such as CRTs. This need has not heretofore been fulfilled in the art by prior bit mapped, frame buffer systems.

There have thus been described methods and apparatus for producing arbitrarily shaped and arbitrarily addressed tiles in graphics frame buffer systems. While preferred embodiments have been disclosed and described, it will be recognized by those with skill in the art that modifications are within the true spirit and scope of the invention. The appended claims are intended to cover all such modifications.

What is claimed is:

1. A method of rendering graphics primitives to a display device in a computer graphics frame buffer system including an array of addressable video random access memory (VRAM) chips associated to form a graphics frame buffer, comprising the steps of:

addressing the VRAMs in the frame buffer with coordinate pixel locations on the display device corresponding to locations of the graphics primitives on the display device, said addressing step including individually addressing each VRAM with a separate column and row address on the display device; and accessing the frame buffer with a graphics renderer according to arbitrarily shaped tiles containing pixels such that the pixels with the tiles have potentially different VRAM addresses, said accessing step comprising the sub-steps of generating a plurality of tiles for all pixels of a particular primitive that have a common y address modulo N, where N represents a predetermined number; assigning a separate modulo N number to each of the plurality of tiles; generating all pixels for a primitive with a common y address, thereby generating a span of each of the plurality of tiles; sequentially generating consecutive x addresses for each span; providing the column and row addresses of a first pixel in each span and a subsequent column for generation of subsequent tiles; and generating frame buffer addresses for the graphics primitives from the plurality of span column and row addresses.

2. The method recited in claim 1 wherein the accessing step further comprises:

dynamically modifying the arbitrarily-shaped tiles into groups of pixels that provide a best fit to the graphics primitives.

3. The method recited in claim 1 wherein the display device is a cathode ray tube (CRT).

4. The method recited in claim 1 wherein the VRAMs are 128 k VRAMs that are eight bits deep.

5. A system for rendering graphics primitives comprising:

displays means for displaying the graphics primitives;

frame buffer means interfaced with the display means for addressing the primitive's locations on the display means according to a plurality of rows and columns;

rendering means interfaced with the frame buffer means for generating groups of pixel values on the display means corresponding to the graphics primitives, said rendering means comprising a plurality of pixel sub-renderers, wherein each of the plurality of sub-renderers is loosely coupled with each of the other plurality of sub-renderers, and wherein each of the sub-renderers generates all pixel values for the graphics primitives that have a common y address modulo a predetermined value, thereby generating a predetermined span of pixels; and access means interfaced with the frame buffer means for accessing tiles on the frame buffer means wherein the tiles are dynamically modified by the access means to obtain a best fit of the groups of pixels to the graphics primitives.

6. The system recited in claim 5 wherein the means for displaying graphics primitives is a cathode ray tube (CRT).

7. The system recited in claim 6 wherein the frame buffer means comprises a plurality of addressable video random access memory (VRAM) integrated circuit chips.

8. The system recited in claim 7 wherein there are four sub-renderers.

9. The system recited in claim 5 wherein the predetermined value is four.

10. The system recited in claim 9 wherein each of the four sub-renderers generates the pixels in a span sequentially with consecutive x addresses on the CRT.

11. The system recited in claim 10 wherein each sub-renderer provides a y address and a x address of a first pixel generated in a span, and a subsequent direction on the CRT for generation of subsequent pixels.

12. A method of improving tile hit rate in a computer graphics frame buffer system comprising the steps of:

mapping to the frame buffer column and row addresses of pixel values corresponding to graphics primitives imaged on a display device;

generating groups of pixels into tiles corresponding to the graphics primitives on the display device;

dynamically modifying the groups of pixels into arbitrarily shaped tiles that provide an optimal tile hit rate for generating primitives; and repeatedly accessing the frame buffer to obtain the arbitrarily shaped tiles and to render the graphics primitives to the display device, said repeatedly accessing step comprising the sub-steps of:

generating a plurality of tiles for all pixels of a primitive that have a common y address modulo four;

assigning a separate modulo four number to each of the plurality of tiles;

generating for each of the plurality of tiles all pixels for a primitive with a common y address, thereby generating a plurality of spans comprising the plurality of tiles;

generating sequentially for the plurality of spans consecutive x addresses on the CRT; and generating x and y addresses for a first pixel in each of the plurality of spans and subsequent columns for generation of subsequent span pixels.

13. The method recited in claim 12 wherein the display device is a cathode ray tube (CRT).

14. The method recited in claim 13 wherein the frame buffer comprises a plurality of addressable video random access memory (VRAM) integrated circuit chips.

15. The method recited in claim 14 wherein the dynamically modifying step comprises the step of driving a unique column and row address for each VRAM in the frame buffer.

16. The method recited in claim 15 further comprising the steps of:

choosing a row and column address of a pixel from each of the plurality of spans; and generating a plurality of span addresses for each of the plurality of spans relative to the frame buffer from the generated pixel row and column addresses.

17. The method recited in claim 16 wherein there are four spans corresponding to four tiles.

18. The method recited in claim 17 wherein the tile hit rate is increased by about 100%.

* * * * *